(12) United States Patent
Bates et al.

(10) Patent No.: US 7,770,155 B2
(45) Date of Patent: Aug. 3, 2010

(54) DEBUGGER APPARATUS AND METHOD FOR INDICATING TIME-CORRELATED POSITION OF THREADS IN A MULTI-THREADED COMPUTER PROGRAM

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1308 days.

(21) Appl. No.: 11/266,737

(22) Filed: Nov. 3, 2005

(65) Prior Publication Data

US 2007/0168968 A1    Jul. 19, 2007

(51) Int. Cl.
*G06F 9/44*    (2006.01)
(52) U.S. Cl. .................. 717/128; 717/127; 717/129
(58) Field of Classification Search ............. None
See application file for complete search history.

(56) References Cited

U.S. PATENT DOCUMENTS 6,681,384 B1 *    1/2004    Bates et al. ................. 717/129

* cited by examiner

*Primary Examiner*—Chuck O Kendall
(74) *Attorney, Agent, or Firm*—Martin & Associates, LLC

(57) ABSTRACT

A debugger inserts instrumentation hooks in a multi-threaded computer program that allow collecting a program trace and that provide timestamps that correspond to the program trace. When a breakpoint in a first thread is encountered, a timestamp corresponding to the breakpoint is retrieved. Execution of the other threads may continue until the debugger is able to halt their execution. Once the execution of all threads has been halted, the program trace for each thread is traced backwards to a point where the timestamp is less than the breakpoint timestamp. Instructions are then executed, one by one, until the execution time of the instructions plus the timestamp is approximately the same as the breakpoint timestamp. The instruction in the program trace display is then highlighted to indicate the instruction that was likely being executed when the breakpoint in the first thread is encountered.

11 Claims, 9 Drawing Sheets

```
Debugger                1210                                    _ □ ×
File  Edit  Debug  Breakpoint  Actions  Window  Help   1220

┌─────────────────────────────────────────────────────────┐
│ Thread 00152                                       1230 │
│ 9     Result = malloc(100);                             │
│ 10    StrPtr = Result;                                  │
│ 11    sprintf(StrPtr,"    %05X    ",Offset);            │
│ 12    StrPtr += 12;                                     │
│ 13    i = 0;                                            │
│ 14    while (i<Len) {                                   │
│ 15        if ((i%8) == 0) {                             │
│ 16            memcpy(StrPtr," ",1);                     │
│ 17            StrPtr++;                                 │
│ 18            memcpy(StrPtr,InputStr,1);                │
│ 19        }                                             │
│ 20        else {                                        │
│ 21            memcpy(StrPtr,InputStr,1);                │
│ 22        }                                             │
│ 23        i++;                                          │
│ 24        InputStr++;                                   │
│ 25        StrPtr++;                                     │
│ 26    }                                                 │
│ 27    Fill_Zeroes(Str,Len);                             │
│ 28    strcpy(StrPtr,Str);                               │
│ 29    StrPtr += strlen(Str);                            │
│ 30    memcpy(StrPtr," - ",4);                           │
│ 31    StrPtr += 4;                                      │
└─────────────────────────────────────────────────────────┘
```

| Threads | | | | | | | 1240 |
|---|---|---|---|---|---|---|---|
| Enabled | Thread ID | Initial | Stopped | Module | Line | Statement | Program |
| ☑ | 00148 | ✓ | | Test1 | 87 | 84 | TestProg |
| ☑ | 00149 | | | Test1 | 17 | 42 | TestProg |
| ☑ | 00150 | | | Test1 | 30 | 49 | TestProg |
| ☑ | 00151 | | | Test1 | 17 | 29 | TestProg |
| ☑ | →00152 | | ✓ | Test1 | 30 | 12 | TestProg |
| ☑ | 00153 | | | Test1 | 44 | 56 | TestProg |
| ☑ | 00154 | | | Test1 | 49 | 58 | TestProg |

Debugger     1210

File   Edit   Debug   Breakpoint   Actions   Window   Help     1220

Thread 00151     1230

```
9    Result = malloc(100);
10   StrPtr = Result;
11   sprintf(StrPtr,"   %05X   ",Offset);
12   StrPtr += 12;
13   i = 0;
14   while (i<Len) {
15       if ((i%8) == 0) {
16           memcpy(StrPtr," ",1);
17           StrPtr++;
18           memcpy(StrPtr,InputStr,1);
19       }
20       else {
21           memcpy(StrPtr,InputStr,1);
22       }
23       i++;
24       InputStr++;         ← 1310
25       StrPtr++;
26   }
27   Fill_Zeroes(Str,Len);
28   strcpy(StrPtr,Str);
29   StrPtr += strlen(Str);
30   memcpy(StrPtr," - ",4);
31   StrPtr += 4;
```

Threads     1240

| Enabled | Thread ID | Initial | Stopped | Module | Line | Statement | Program |
|---|---|---|---|---|---|---|---|
| ☑ | 00148 | ✓ |   | Test1 | 87 | 84 | TestProg |
| ☑ | 00149 |   |   | Test1 | 17 | 42 | TestProg |
| ☑ | 00150 |   |   | Test1 | 30 | 49 | TestProg |
| ☑ | →00151 |   |   | Test1 | 17 | 29 | TestProg |
| ☑ | 00152 |   | ✓ | Test1 | 30 | 12 | TestProg |
| ☑ | 00153 |   |   | Test1 | 44 | 56 | TestProg |
| ☑ | 00154 |   |   | Test1 | 49 | 58 | TestProg |

DEBUGGER APPARATUS AND METHOD FOR INDICATING TIME-CORRELATED POSITION OF THREADS IN A MULTI-THREADED COMPUTER PROGRAM

BACKGROUND OF THE INVENTION

1. Technical Field

This invention generally relates to computer systems, and more specifically relates to the debugging of computer programs.

2. Background Art

As the sophistication and complexity of computer hardware and software increase, the more difficult the software is to debug. Debugging is the process of finding problems, or "bugs", during the development of a computer program. Most modern programming, environments include a debugger that provides tools for testing and debugging a computer program. Known debuggers allow the user to set one or more breakpoints in the computer program, which are points where the execution of the computer program is stopped so that the state of the program can be examined to verify that the program executed as designed.

In a multi-threaded computer program, multiple threads of execution are defined. Different threads of execution may be executed in parallel. In a computer system that has multiple processors, different threads of execution may be executed on different processors, providing true real-time parallel processing of the threads. Debugging a multi-threaded computer program is difficult because each thread runs independently of the other threads. When a breakpoint is hit in one of the threads, the debugger attempts to halt the other threads as quickly as possible, but it is possible for a thread to execute thousands or even hundreds of thousands of instructions to be executed before the thread is halted. This inability to stop the threads all at once, and the extra "run on" which results, presents an unrealistic view of the program execution to the user. Using known debuggers, a programmer may switch between threads after all threads have been halted, but the programmer has no idea how many instructions were executed in the threads where the breakpoint did not occur after the breakpoint was encountered in the other thread. For this reason, the programmer is presented with data in the debugger that may not be very helpful because it does not accurately represent the state of other threads when a breakpoint was encountered in a first thread. Without a mechanism and method for indicating where a thread was executing when a breakpoint in a different thread is encountered, programmers will continue to suffer from inefficient tools for debugging multi-threaded computer programs on multi-processor computer systems.

DISCLOSURE OF INVENTION

According to the preferred embodiments, a debugger inserts instrumentation hooks in a multi-threaded computer program that allow collecting a program trace and that provide timestamps that correspond to the program trace. When a breakpoint in a first thread is encountered, a timestamp corresponding to the breakpoint is retrieved. Execution of the other threads may continue until the debugger is able to halt their execution. Once the execution of all threads has been halted, the program trace for each thread is traced backwards to a point where the timestamp is less than the breakpoint timestamp. Instructions are then traced, one by one, until the execution time of the instructions plus the timestamp is approximately the same as the breakpoint timestamp. The instruction in the program trace display is then highlighted to indicate the instruction that was likely being executed when the breakpoint in the first thread is encountered. In this manner, the problem with the threads not all halting at once is not solved, but compensation is provided after all threads have been halted to indicate to the programmer the instruction that each thread was executing when the breakpoint in the first thread was encountered.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 12 is a sample debugger display showing the indication of a stop point in a thread when a breakpoint is encountered; and FIG. 13 is a sample debugger display showing the indication of a stop point in a different thread when the breakpoint in the thread of FIG. 12 is encountered.

BEST MODE FOR CARRYING OUT THE INVENTION

The preferred embodiments indicate a time-correlated position for one or more other threads when a breakpoint in a first thread is encountered. The other threads may run on for some time after the execution of the breakpoint, resulting in executing many instructions in other threads after the breakpoint in the first thread is encountered. When the breakpoint in the first thread is encountered, a timestamp is saved. After the other threads have been halted, the debugger backs up in each thread to a point where a timestamp is less than the saved timestamp of the breakpoint. The debugger then traces instructions one at a time until the timestamp of the backup point plus the execution time of the instructions is approximately equal to the saved timestamp. The debugger then identifies which instruction was being executed in each thread when a breakpoint in the first thread was encountered. The preferred embodiments provide the programmer with information to know what the other threads were doing when the breakpoint in the first thread was encountered.

Figure 1:
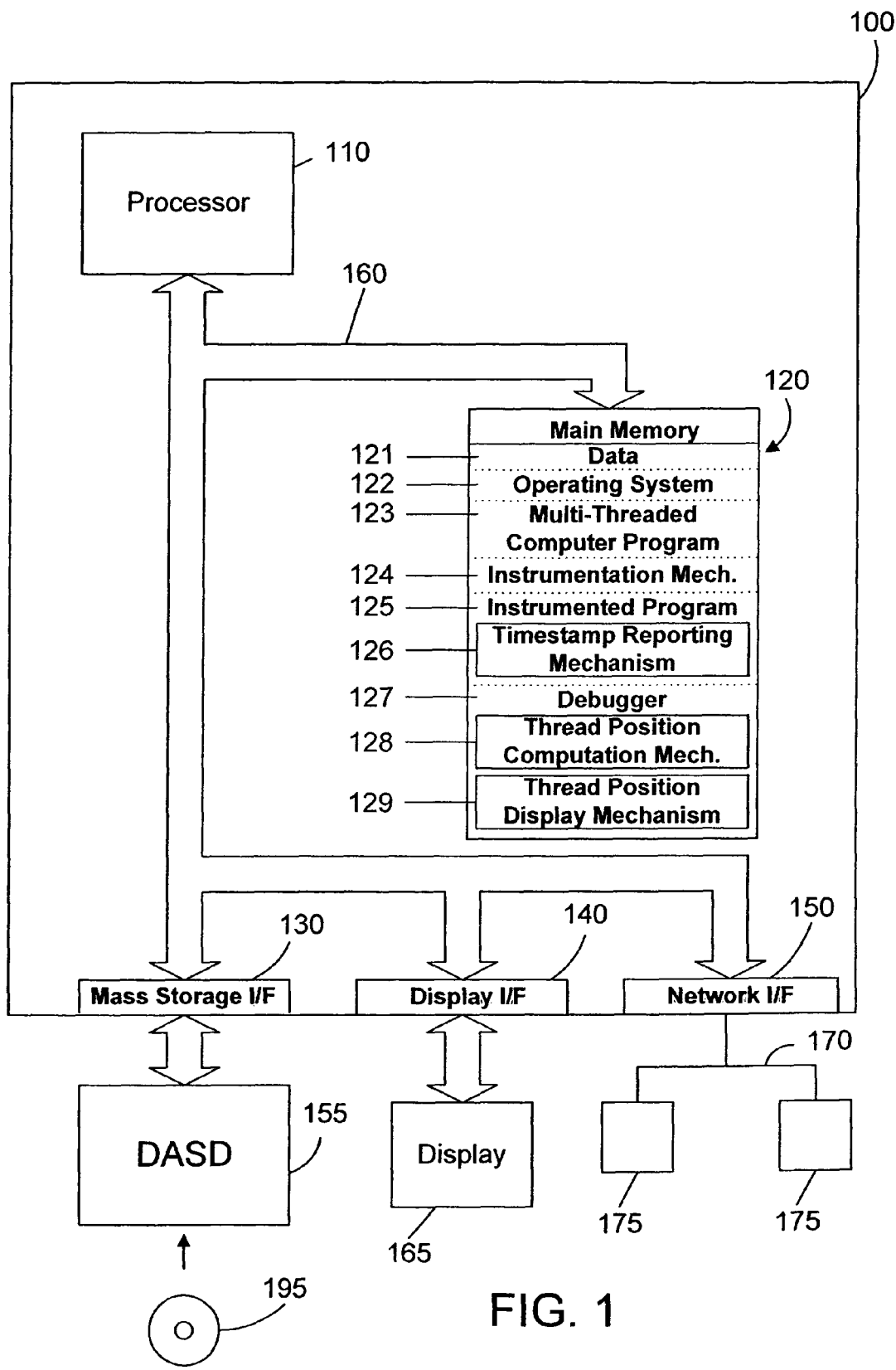
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a multi-threaded computer program 123, an instrumentation mechanism 124, a instrumented program 125, and a debugger 127. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Multi-threaded program 123 represents any computer software that includes multiple threads of execution. Instrumentation mechanism 124 inserts instrumentation hooks into the multi-threaded computer program 123 to allow debugging the multi-threaded computer program 123. The instrumentation mechanism 124 outputs an instrumented program 125 that includes a timestamp reporting mechanism 126. The timestamp reporting mechanism 126 provides timestamps in the program trace that is output by the instrumented program 125.

The debugger 127 includes a thread position computation mechanism 128 to compute which instruction was likely being executed in a thread when a breakpoint in a different thread occurs. The thread position computation mechanism 128 operates as discussed in more detail below. Once the thread position computation mechanism 128 identifies an instruction that was likely being executed when a breakpoint in a different thread occurred, the thread position display mechanism 129 provides a visual indication to the user of the debugger 127 to identify that instruction. For example, the instruction could be highlighted in the display with color, reverse video, a special marker, or any other suitable visual indication to the user. In this manner, the debugger 127 allows efficiently debugging a multi-threaded computer program by indicating instructions in each thread that were likely being executed when a breakpoint in a different thread was encountered. With this more accurate information, the programmer is much better equipped to perform debugging of a multi-threaded computer program.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, multi-threaded computer program 123, instrumentation mechanism 124, instrumented program 125, and debugger 127 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links. Note that the preferred signal bearing media is tangible.

Figure 2:
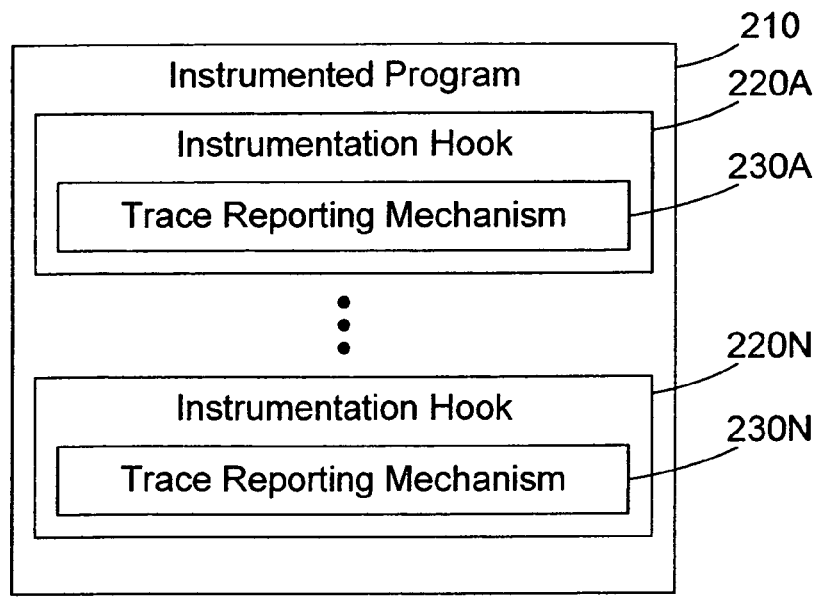
FIG. 2 is block diagram of a prior art instrumented program.

We now present a discussion of known debuggers and instrumentation hooks to provide a context for discussing the preferred embodiments. Referring to FIG. 2, a prior art instrumented program 210 includes a plurality of instrumentation hooks, shown in FIG. 2 as 220A, ..., 220N. Each instrumentation hook includes a trace reporting mechanism, shown in FIG. 2 as 230A, ..., 230N. The trace reporting mechanism is executable code that provides information that allows determining the current location where the code is being executed.

Figure 3:
FIG. 3 is block diagram showing the prior art conversion of a program to an instrumented program.

The prior art instrumented program 210 in FIG. 2 is generated as shown in FIG. 3. A program 300 is input into an instrumentation mechanism 310, which inserts the instrumentation hooks shown in FIG. 2, and outputs the instrumented program 210. There are many known mechanisms for inserting instrumentation hooks, and many known instrumentation hooks in the art. One specific way to instrument a program is discussed in a paper by *Ball and Larus*, "Optimally Profiling and Tracing Programs", ACM Transactions on Programming Languages and Systems, July 1994. This paper discusses a known way to insert instrumentation hooks for the purpose of tracing program execution in a computer program. The system presented in the Ball and Larus paper above represents one possible implementation for the instrumentation mechanism 310 and resulting instrumented program 210 in FIGS. 2 and 3.

Figure 4:
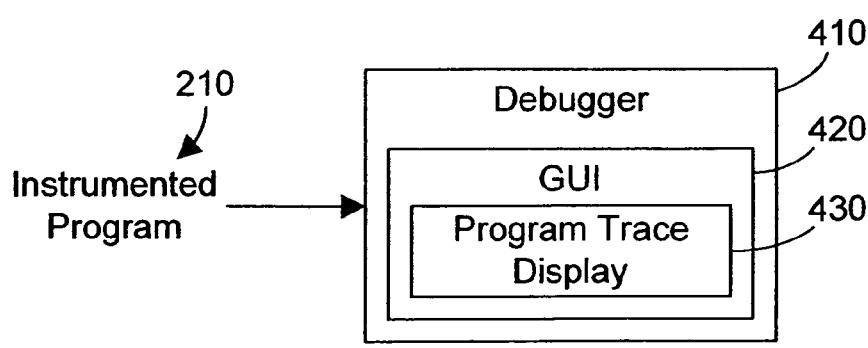
FIG. 4 is a block diagram of a prior art debugger for debugging an instrumented program.

Once the instrumentation mechanism 310 creates the instrumented program 210 shown in FIGS. 2 and 3, the instrumented program 210 may be executed by a debugger 410, as shown in FIG. 4. Debugger 410 includes a graphical user interface 420 that provides a program trace display 430 for the instrumented program 210. The program trace display provides a graphical display that allows the programmer to debug the instrumented program 210.

The prior art system shown in FIGS. 2-4 works reasonably well with computer programs that are not multi-threaded. However, when a multi-threaded program is executed on a computer system that has multiple processors, direct control of all of the threads is not possible. As a result, some problems can arise from attempting to debug a multi-threaded computer program using the known system in FIGS. 2-4.

Figure 5:
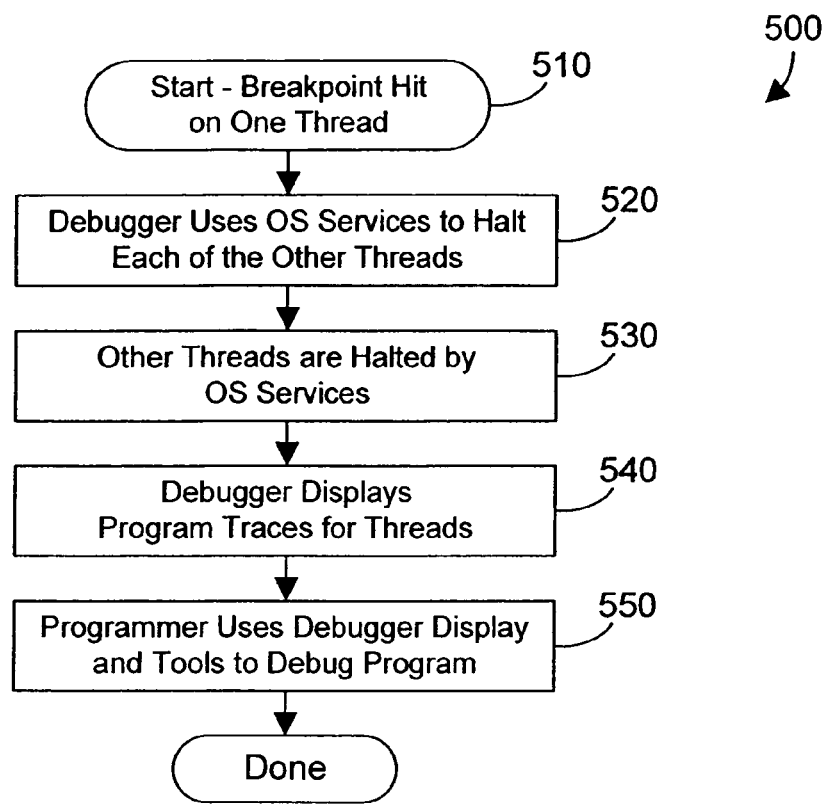
FIG. 5 is a flow diagram of a prior art method for debugging a multi-threaded computer program.

Referring to FIG. 5, a prior art method 500 assumes a prior art debugger 410 has been used to insert a breakpoint in a program executed by one of the threads of a multi-threaded computer program. Method 500 begins when the breakpoint in one of the threads is hit (step 510). The breakpoint stops execution of the thread that hit the breakpoint, but execution of the other threads continues. As a result, the debugger uses operating system services to halt each of the other threads (step 520). Each of the other threads are then halted by the operating system services (step 530). The debugger then displays the program traces for the threads (step 540). The programmer may then use the debugger display and tools the debugger provides to debug the program (step 550).

A significant problem with prior art method 500 is there is no guaranteed timing relationships between stop points for different threads. Thus, the first thread that contains the breakpoint is halted, a second thread could execute over a hundred instructions before being stopped, and a third thread could execute thousands of instructions before being stopped. The program trace for the threads displayed in step 540 shows the stopping point for the threads, but because these stopping points are not time-correlated to each other, the programmer has absolutely no idea how many instructions have been executed since the breakpoint in the first thread was encountered. As a result. the prior art debugger and method are not terribly useful in debugging multi-threaded computer programs.

Figure 6:
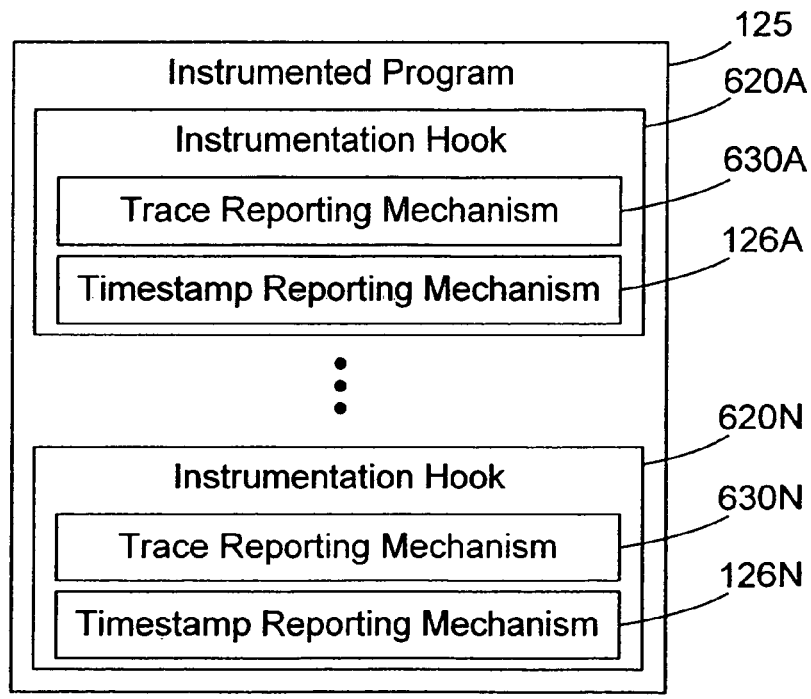
FIG. 6 is a block diagram of an instrumented program in accordance with the preferred embodiments.

The present invention solves the problems in the prior art by providing timestamps that allow time-correlating instructions in one thread to instructions in a different thread. Referring to FIG. 6, an instrumented program 125 of the preferred embodiments includes instrumentation hooks 620A, ..., 620N that each include a trace reporting mechanism (as in the prior art) along with a timestamp reporting mechanism. Thus, instrumentation hook 620A includes a trace reporting mechanism 630A and a timestamp reporting mechanism 126A. In like manner, the other instrumentation hooks include the trace reporting mechanism and the timestamp reporting mechanism, up to the last instrumentation hook 620N that includes trace reporting mechanism 630N and timestamp reporting mechanism 126N. By including a timestamp reporting mechanism in each hook, the instrumented program has periodic timestamps that allow the instructions in one thread to be time-correlated to instructions in a different thread.

Figure 7:
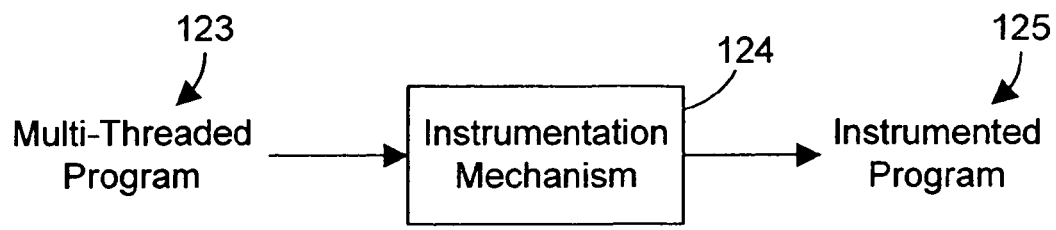
FIG. 7 is a block diagram showing conversion of a program to an instrumented program in accordance with the preferred embodiments.
Figure 8:
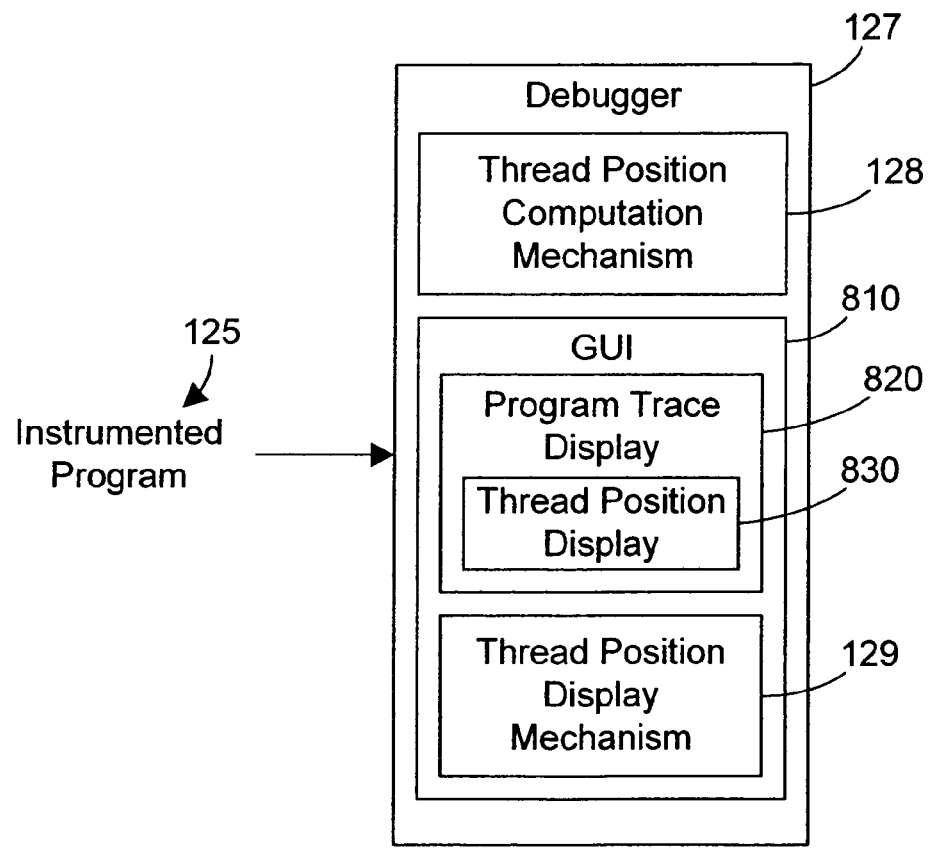
FIG. 8 is a block diagram of a debugger for debugging an instrumented program in accordance with the preferred embodiments.

Referring to FIG. 7, the instrumentation mechanism 124 of the preferred embodiments receives as input a multi-threaded program 123, and inserts the instrumentation hooks to produce the instrumented program 125 shown in FIGS. 1 and 6. Instrumentation mechanism 124 is preferably part of a compiler. The instrumented program 125 is then executed by a debugger 127 in accordance with the preferred embodiments, as shown in FIG. 8. The debugger 127 includes a thread position computation mechanism 128 that determines (or computes) where each thread was executing when a breakpoint in a different thread occurred. The thread position computation mechanism 128 indicates the position of the thread to the thread position display mechanism 129, which then displays the position of the thread in the thread position display 830 in the program trace display 820 in the GUI 810. The thread position display mechanism 129 may indicate the position of the thread in the thread position display 830 using any suitable means, including highlighting, coloring, marking with an arrow or other marker, etc. The timestamps in the trace allow time-correlating instructions in one thread to instructions in a different thread.

Figure 9:
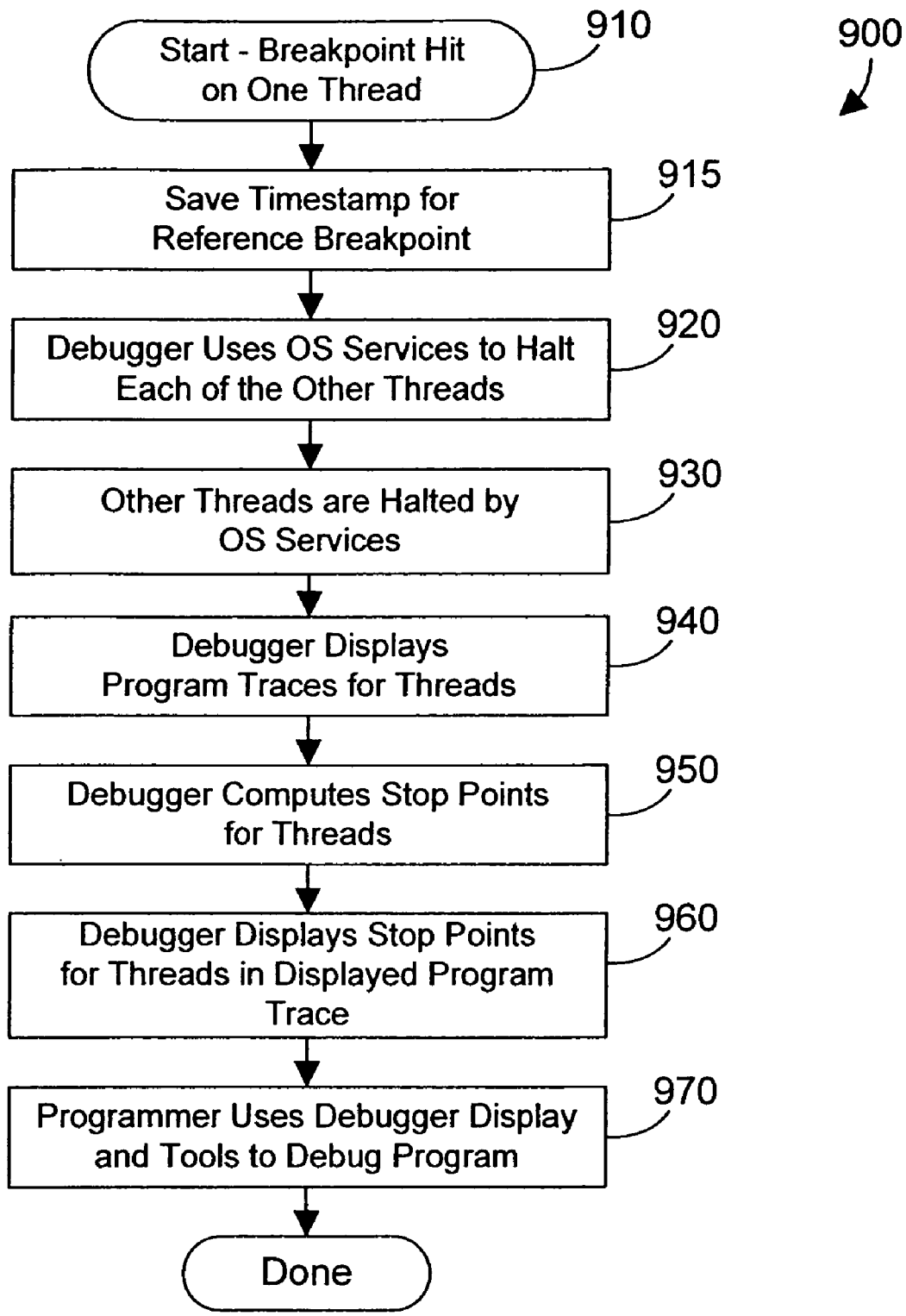
FIG. 9 is a flow diagram of a method in accordance with the preferred embodiments for indicating in a debugger display stop points for a thread when a breakpoint in a different thread is encountered.

Referring to FIG. 9, a method 900 in accordance with the preferred embodiments begins when a breakpoint is hit on one thread (step 910). This breakpoint is referred to in the rest of FIG. 9 as the "reference breakpoint". A timestamp is then saved for the reference breakpoint (step 915). The debugger then uses operating system services to halt each of the other threads (step 920). Each of the other threads are halted by the operating system services (step 930). Note that timestamps are being saved for each thread by the instrumentation hooks each time an instrumentation hook is executed. The debugger then displays the program traces for the threads (step 940). The debugger then determines the stop points for the threads (step 950). The stop points in step 950 are the instructions that correspond to the time when the reference breakpoint was encountered, even though there may be hundreds or even thousands of instructions after the stop points. The debugger then displays the stop points for the threads in the displayed program trace (step 960). The programmer then uses the debugger display and provided tools to debug the program (step 970).

Figure 10:
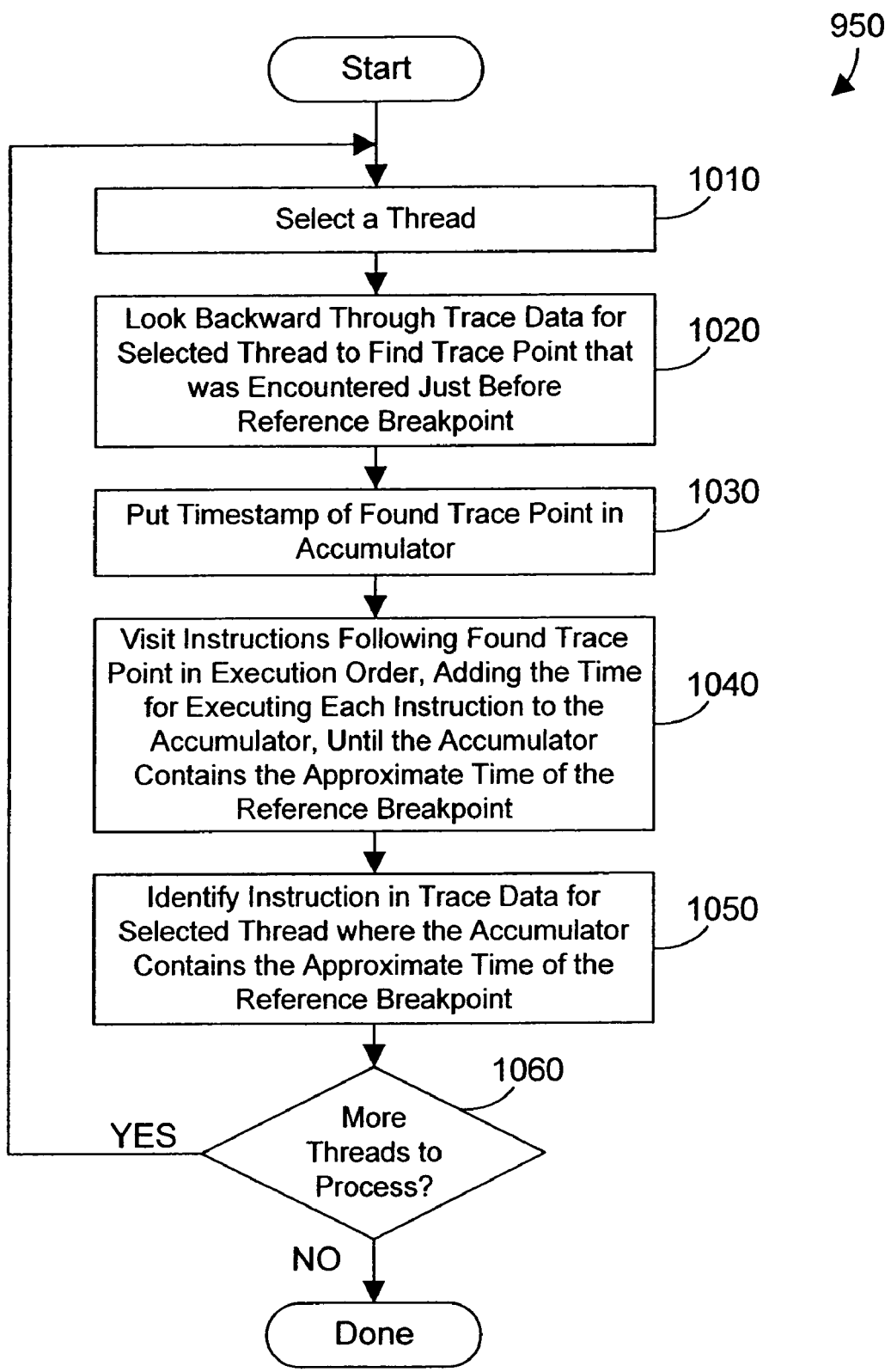
FIG. 10 is a flow diagram of one specific implementation of step 950 in FIG. 9 in accordance with the preferred embodiments.

One of the significant features of method 900 is determining the stop points for the threads in step 950. A method 950 shown in FIG. 10 illustrates one suitable implementation for step 950 in FIG. 9 in accordance with the preferred embodiments. First, a thread is selected (step 1010). The trace data is then analyzed in a backwards direction to find a trace point that was encountered just before the reference breakpoint (step 1020). The timestamps for the trace points are compared to the timestamp for the reference breakpoint until the trace point is located that is the first to have a timestamp that is less than the timestamp of the reference breakpoint. The timestamp of the found trace point is then put into an accumulator (step 1030). The instructions after the trace point are then visited in execution order, adding the time of each instruction to the accumulator until the accumulator contains the approximate time of the reference breakpoint (step 1040). An instruction in the trace data for the selected thread where the accumulator contains the approximate time of the reference breakpoint is then identified (step 1050). If there are more threads to process (step 1060=YES), method 950 returns to step 1010 and continues. If there are no more threads to process (step 1060=NO), method 950 is done.

Figure 11:
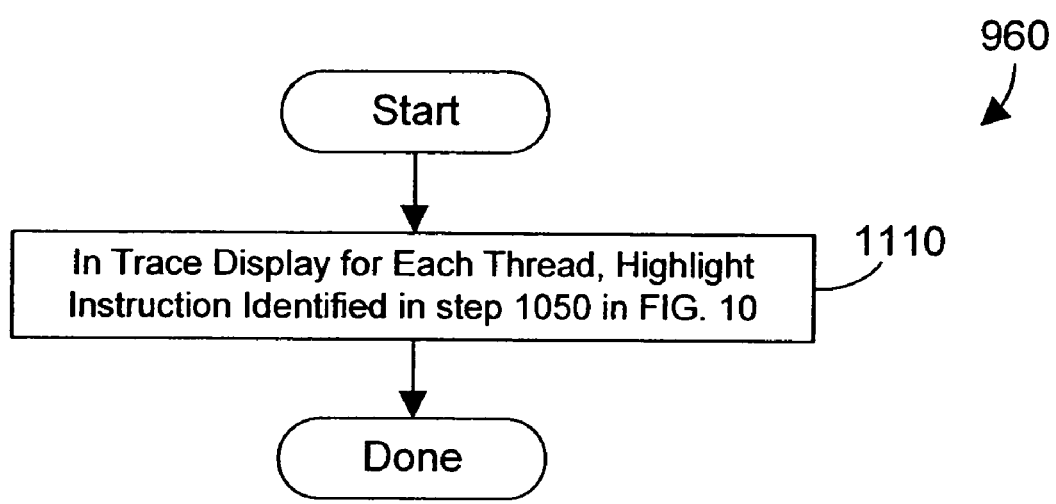
FIG. 11 is a flow diagram of one specific implementation of step 960 in FIG. 9 in accordance with the preferred embodiments.

A method 960 shown in FIG. 11 illustrates one suitable implementation for step 960 in FIG. 9 in accordance with the preferred embodiments. One suitable way to display the stop points for threads in step 960 in FIG. 9 is, in the trace display for each thread, highlight the instruction identified in step 1050 in FIG. 10 (step 1110). A highlight may be any visual indication, including a colored background, colored text, arrow or other marker, etc. By highlighting the instruction in step 1110, the programmer using the debugger now knows approximately where the thread was when the breakpoint fired in the other thread. In this manner, the execution of instructions in one thread may be time-correlated to instructions in a different thread, thereby providing the programmer accurate information regarding the instruction each thread was executing when the breakpoint in the first thread was encountered.

Note that the identification of stop points in step 960 of FIG. 9 may not give an exact indication of the exact instruction that was being executed, but gives the programmer a much better idea of approximately where the thread was executing so debugging may proceed much quicker. In other words, it is possible that the indication of an instruction is off by one or two instructions. However, this information gives the programmer a much closer indication of what was going on in a thread when a breakpoint in a different thread occurred. Contrast this with the prior art, which would show the end point of a thread after executing possibly thousands of instructions since the breakpoint occurred in the first thread, without providing any indication of the relevance (or irrelevance) of the displayed program trace.

A simple example is now presented to illustrate the concepts of the preferred embodiments. Referring to FIG. 12, a display window 1200 is the display for a debugger, as shown in the title bar 1210. The display includes a menu bar 1220 that provide various menu functions for the debugger. The providing of menu functions is well-known in the art of graphical user interfaces. Two windows 1230 and 1240 are provided. Window 1230 shows the program trace for a selected thread. Window 1240 shows a list of all threads, and provides status information for the threads. We assume for this example that thread 152 has been selected in window 1240, as indicated by the black arrow pointing to 00152 in the Thread ID column. With thread 00152 selected, the program trace for thread 00152 is displayed in window 1230, which shows sample code for the program TestProg that is being executed by thread 00152. Note that each line in the code is numbered. We assume for this example that a breakpoint was set for thread 00152, and this breakpoint was hit at line 12, when the instruction StrPtr+=12 was executed. This is the reason line 12 is highlighted with a box in window 1230, to indicate the stop point for thread 00152.

Once the breakpoint was encountered, the debugger uses operating system services to halt the other threads. Each thread is halted by the operating system services. We assume that all threads are halted, and the display 1200 in FIG. 13 is then displayed. We also assume the programmer clicks on the Thread 00151 row in window 1240, which causes the program trace for thread 00151 to be displayed in window 1230. For this very simplified example, we assume all the threads are executing identical code in the TestProg program, as shown in window 1240. When thread 00151 is stopped, line 29 is highlighted with a box to indicate this is the next instruction to be executed. Now the debugger can use the timestamp information to determine what thread 00151 was doing at the time the first breakpoint occurred. This is done by backing up in the program trace instruction-by-instruction to find the first trace point in thread 00151 that has a timestamp that is less than the timestamp of the reference breakpoint. Once this trace point is identified, the instructions following the identified trace point are traced, one by one, until the timestamp plus the execution times of the following instructions is approximately equal to the timestamp of the reference breakpoint. Note that "approximately equal to" gives some flexibility in determining which instruction to choose. Thus, if one instruction has a timestamp plus execution time value that is less than the timestamp of the reference breakpoint, and the following instruction has a timestamp plus execution time value that is greater than the timestamp of the reference breakpoint, either of the instructions could be used as the stopping point in the thread that corresponds to the reference breakpoint. In thread 00151, we assume that the instruction in line 24 is marked as the instruction that was being executed in thread 00151 when the breakpoint in thread 00152 was executed. Note that the visual indication in FIG. 13 is an arrow 1310 that points to the instruction. However, one skilled in the art will appreciate that there are a large number of different ways for providing a visual indication, including variations in color, brightness, background, font size, font type, as well as using markers of any suitable kind (such as arrow 1310 in FIG. 13).

In the very simplified example in FIG. 13, the stop point for thread 00151 is indicated at line 29 with the box that highlights line 29. The arrow 1310 highlights line 24, which we assume to be the instruction thread 00151 was executing at the time the breakpoint in thread 00152 occurred. While the difference in this simple example is only five lines of code, it still illustrates the difference between actual stop point and time-correlated stop point that identifies the instruction that was likely being executed when the breakpoint occurred. Extrapolating this simple example to a more complex case where thousands of instructions were executed by thread 00151 after the breakpoint in thread 00152, the highlight (e.g., 1310) that provides the time-correlated stop point for thread 00151 will help the programmer to easily identify where each thread was executing when thread 00152 hit its breakpoint.

The preferred embodiments provide an indication in a second thread of which instruction was being executed by the second thread when breakpoint in a first thread occurred. Note that the discussion herein references breakpoints. Note, however, that breakpoints are simply one type of event in a thread that could be monitored. The preferred embodiments expressly extend to any and all events that may be monitored in a debugger, whether currently known or developed in the future.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   a multi-threaded computer program residing in the memory, the multi-threaded computer program including first and second threads; and
   a debugger residing in the memory and executed by the at least one processor, the debugger executing the multi-threaded computer program, identifying a breakpoint in the first thread, halting the execution of the second thread, retrieving a breakpoint timestamp corresponding to the breakpoint, determining a first instruction location in the second thread having a timestamp less than the breakpoint timestamp, and tracing instructions executed on the second thread one instruction at a time until a second instruction location in the second thread having a timestamp similar to the breakpoint timestamp is determined.

2. The apparatus of claim 1 wherein the debugger further displays the second instruction location in the second thread in a graphical display.

3. The apparatus of claim 2 wherein the display of the second instruction location in the second thread by the debugger comprises highlighting an instruction at the second instruction location in the second thread in the graphical display.

4. The apparatus of claim 1 wherein the multi-threaded computer program comprises a timestamp reporting mechanism that reports a timestamp when a trace point in the second thread is encountered.

5. A computer-implemented method for debugging a computer program that includes first and second threads, the method comprising:
   identifying a breakpoint in the first thread;
   halting the execution of the first thread and the second thread;
   retrieving a breakpoint timestamp corresponding to the breakpoint;
   determining a first instruction location in the second thread having a timestamp less than the breakpoint timestamp, and;
   tracing instructions executed on the second thread one instruction at a time until a second instruction location in the second thread having a timestamp similar to the breakpoint timestamp is determined.

6. The method of claim 5 further comprising:
   displaying the second instruction location in the second thread in a graphical display.

7. The method of claim 6 wherein the display of the second instruction location comprises highlighting an instruction at the second instruction location in the second thread in the graphical display.

8. A computer-implemented method for determining location of executing a second thread at the time an event occurred in a first thread, the method comprising the steps of:
   inserting trace points into a computer program that includes the first and second threads;
   gathering timestamp information when at least one trace point is encountered in the second thread;
   generating a timestamp for an event in the first thread;
   determining in the second thread a selected trace point that was encountered prior to the event in the first thread;
   computing an instruction execution time for each instruction that executed after the selected trace point up to the instruction that was executing at or immediately prior to the timestamp for the event; and
   identifying a location in the second thread that corresponds to the time of the event in the first thread.

9. A computer program product comprising a computer useable storage medium including a computer readable program, wherein the computer readable program when executed on a computer causes the computer to:
   identify a breakpoint in the first thread;
   halt the execution of the first thread and the second thread;
   retrieve a breakpoint timestamp corresponding to the breakpoint;
   determine a first instruction location in the second thread having a timestamp less than the breakpoint timestamp, and;
   trace instructions executed on the second thread one instruction at a time until a second instruction location in the second thread having a timestamp similar to the breakpoint timestamp is determined.

10. The program product of claim 9 wherein the debugger further displays the second instruction location in the second thread a graphical display.

11. The program product of claim 10 wherein the display of the second instruction location in the second thread by the debugger comprises highlighting an instruction at the second instruction location in the second thread in the graphical display.

* * * * *